Feb. 5, 1935. C. J. ROBERTSON 1,989,946
BRAKE MECHANISM FOR REVERSING MECHANISM
Filed Nov. 11, 1931 2 Sheets-Sheet 1

Inventor.
Charles James Robertson
by
Attorney

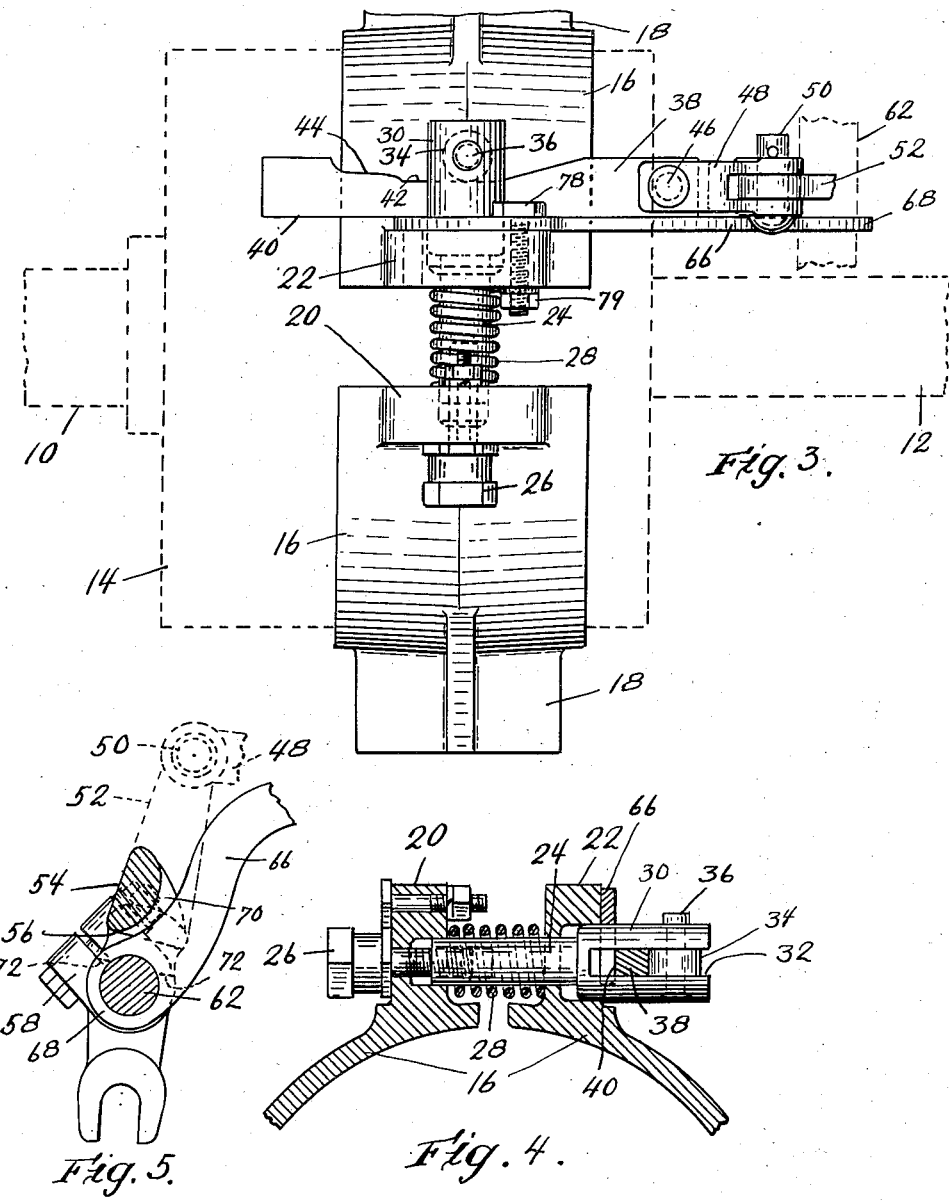

Patented Feb. 5, 1935

1,989,946

UNITED STATES PATENT OFFICE 1,989,946

BRAKE MECHANISM FOR REVERSING MECHANISM

Charles James Robertson, Taunton, Mass., assignor to Evans Stamping and Plating Company, Taunton, Mass., a corporation of Massachusetts Application November 11, 1931, Serial No. 574,251

17 Claims. (Cl. 188—77)

This invention relates to reversing mechanisms, especially adapted, although not necessarily restricted, to marine propulsion.

A common form of reversing mechanism, and the form with which this invention is particularly concerned, comprises planetary gearing for connecting the driving and driven shafts for reverse drive of the driven shaft, and clutch mechanism for connecting the shafts for the forward drive of the driven shaft. The planetary gearing includes gearing elements connected with a brake drum that is adapted to be held stationary to set the planetary gearing for reverse drive. To this end the brake drum is encircled with a brake band having confronting ends that are forced in opposite directions to contract the band about the drum. The operating mechanism for the brake band includes a rod which is passed through the confronting ends of the band and is engaged with one of them. A cam bar bears against a roller carried by the rod and also bears against the other end of the brake band. The cam bar is moved axially of the driving and driven shafts to move the rod in one direction and the end of the brake band against which the cam bar bears in the other direction thereby to contract the brake. The axial movement of the cam bar tends to move the brake band with it. This axial movement of the brake band is not desirable as it prevents the contraction of the band to the desired extent, tends to tilt the band on the drum, and is otherwise objectionable.

Hence an object of the present invention is the provision of improved mechanism for holding the brake band against axial movement during the setting thereof.

A further object of the invention is the provision of mechanism which holds the brake band against axial movement during the contraction thereof, which mechanism is located close to the cam bar that contracts the band so that the axial thrust of the cam bar on the brake band is taken as directly as may be by the holding means.

A further object of the invention is in the provision of a reversing mechanism of the type above set forth that has means to hold the brake band against axial movement, the holding means comprising a link, one end of which is pivotally supported to permit the band to move substantially radially toward and away from the brake drum, and the other end of which is connected with a free end of the brake band so that the axial thrust on the band is resisted by the link.

A further object of the invention is to have the aforesaid link arranged under the cam bar that operates the brake band so that the link also receives the band contracting pressure of the cam bar.

Another object of the invention resides in a novel method of connecting the link to the brake band.

A yet further object is generally to improve the construction and operation of brake mechanisms for reversing mechanisms.

Fig. 3 is a plan view of the reversing mechanism, and illustrating especially the construction of the brake band and its operating and thrust supporting mechanism.

Fig. 4 is a sectional detail taken along line 4—4 of Fig. 2.

Fig. 5 is a sectional detail taken along line 5—5 of Fig. 1.

Figure 1:
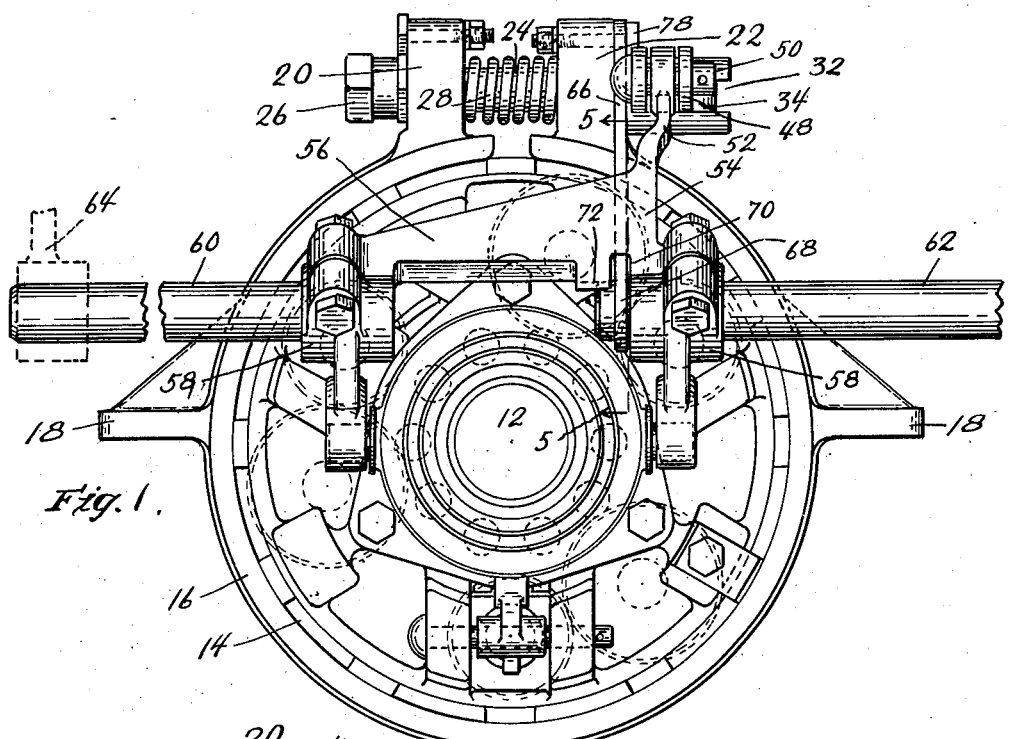
Fig. 1 is an end view, looking forwardly, of a reversing mechanism embodying the present invention.
Figure 2:
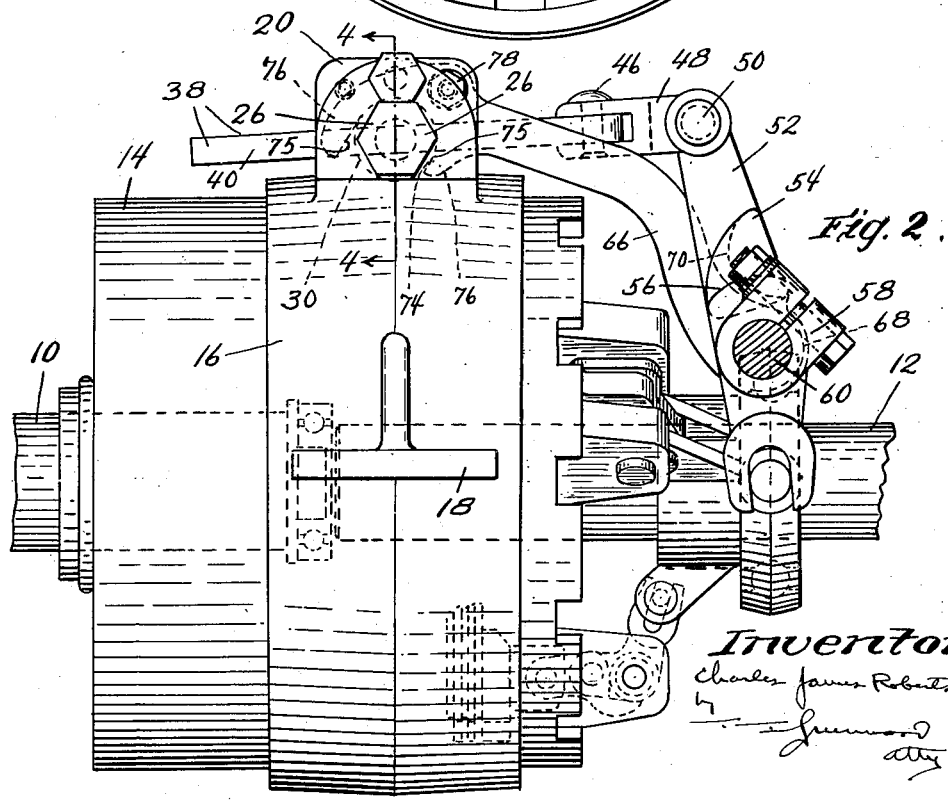
Fig. 2 is a side elevation of the mechanism of Fig. 1.

The reversing mechanism herein shown is adapted to connect the driving shaft 10 and the driven shaft 12 for both forward and reverse drive of the driven shaft. The mechanism includes a casing or drum 14 which contains the reversing gearing and is connected with certain elements thereof and is adapted to be held against rotation to set the gearing for reverse drive. The casing is held stationary by a flexible brake band 16 having radially outstanding opposed horizontal ears 18 that are adapted to engage stationary supports, not shown, to hold the brake band against rotation. The ends of the brake band are extended into opposed upstanding ears 20 and 22 at its confronting ends, which ears are located above the brake drum. The operating mechanism for said brake band includes a cylindrical rod 24 which is slidably received in aligned passages in both of said ears. A bolt 26 is screw-threaded adjustably in one end of said rod and bears against the outer face of the ear 20. A helical compression spring 28 encircles said rod between and bears against the confronting faces of said ears whereby to force the ends of the band apart and thereby expand the band. The other end of the rod 24 is provided with an enlarged cylindrical end 30 that projects beyond the outer face of the ear 22 and is provided with an axially elongated slot 32 therein in the outer end of which a cam roller 34 is located and is secured in position by the pin 36. A band-operating cam bar 38 having a straight rear face 40 that is parallel with the axes of the driving and driven shafts and having a forward parallel dwell face 42 followed by an inclined brake-setting face 44 is located in said slot 32 between the roller 34 and the ear 22. Said cam bar is movable in an axial direction toward the right, Fig. 3, to bring the inclined face 44 thereof against the roller 34 and thereby to move the rod 24 and the ear 20 in one direction and the ear 22 in the opposite direction. The cam bar is pivotally connected in a vertical plane by a pin 46 to a yoke 48 which, in turn, is pivotally connected in a horizontal plane by a pin 50 to the upper end of an operating arm 52. Said arm is rigid with a yoke 54 having a horizontal member 56 that terminates at its ends in hubs 58 which are clamped onto the ends of aligned cross shafts 60 and 62. Said shafts are rotatably supported in suitable bearings, not shown, and one of said shafts is fixed to an operating arm 64 by which the shafts may be moved angularly in one direction to set the brake and thereby the gearing for reverse drive and moved in the opposite direction to free the brake and to set the clutch mechanism for forward drive. The cam bar 38 tends to move the brake band with it when the cam bar is moved axially to contract the brake band about the brake drum.

In accordance with the present invention mechanism is provided to hold the brake band against axial movement while permitting it such movement toward and away from the brake drum as is necessary for effective operation. The holding mechanism for the brake band includes a rigid strut link 66, the rear end 68 of which is pivoted loosely on the extended end of the shaft 62 and is located in the space between the hubs 58 of the yoke 54. Said link is located on said shaft adjacent the right hand hub 58, see Fig. 1, and is received loosely in a slot 70 of the yoke, see Fig. 5. The connecting member 56 of the yoke is provided with a depending ear 72 which partly encircles the extended end of the shaft 62 on the other side of the link so that the link can not come off the shaft although it is permitted a certain amount of freedom of axial movement. The link extends forwardly over the brake drum 14 and its free upper end bears against the outer face of the ear 22 of the brake band. Said end is provided with a notch 74 which extends forwardly from its lower edge and in which the enlarged end 30 of the band contracting rod 24 is removably seated, the bottom of the notch being semi-circular to conform with the configuration of the rod. The ears 76 of the link overlie and engage the rod on opposite sides thereof. The link is secured removably in position in confronting relation with the outer face of the ear 22 by a bolt or screw 78 which passes loosely through the upper portion of the notched end of the link and is screw threaded in the ear 22 of the brake band in such manner that the link is loosely and releasably connected with the brake band. The bolt is locked in adjusted position by the nut 79. The link is interposed between the flat face 40 of the cam bar 38 and the outer face of the ear 22 so that the cam bar slides in engagement with the link and the band contracting pressure of said cam bar is transmitted through said link to the ear 22. The opposed faces 75 of the notch are perpendicular to a line drawn between the axes of the rod 24 and the cross shaft 62 so that the link can be swung about its support on the cross shaft into and out of engagement with the draw-rod 24 and also so that the thrust of the rod 24 on the link has no tendency to disengage the link from the rod. The bolt 78 serves mainly to hold the link and rod from any tendency toward disengagement due to vibration to which the parts may be subjected.

With the arrangement above described pressure of the cam bar on the brake band in a direction axially of the mechanism is transmitted to and resisted by the link 66 and consequently the brake band is held from axial movement during the band contracting movement of the cam bar. The link also receives the band contracting pressure of the cam bar and thus receives the wear that would otherwise be received by the ear of the brake band.

I claim:

1. Brake mechanism for reversing mechanism comprising a brake drum, a brake band encircling said drum and having confronting ends, a rod carried by and extended through said ends for contracting said band, a member engaged with one end of said rod adjacent one band-end for actuating it, said member also exerting a thrust on said band axially of said drum, and means for holding said band against displacement axially of said brake drum comprising a fixed support located behind said brake drum, and a strut member extended axially of said drum and connected with said support and also with said rod between said member and the adjacent band-end.

2. Brake mechanism for reversing mechanism comprising a brake drum, a brake band encircling said drum, operating mechanism for said band comprising an operating member connected with said band and movable axially of said drum to contract said band about said drum, and means to support said band against the axial thrust of said member thereon comprising a fixed support located behind said brake drum, and a rigid strut member connected with said support and extended axially of the drum therefrom toward and engaged with said band at the connection therewith of said operating member.

3. Brake mechanism for reversing mechanism comprising a brake drum, a brake band encircling said drum, operating mechanism for said band comprising a rod connected with said band for contracting it, an operating member connected with said rod and movable in a direction axially of said drum to actuate said rod, and means to support said band against the axial thrust of said member thereon comprising a fixed support located behind said brake drum, and a rigid strut member extended axially of said drum and engaged with said rod between said member and band and having a connection with said fixed support such that said strut member is held against axial movement while permitting radial movement of said band.

4. Brake mechanism for reversing mechanism comprising a brake drum, a brake band encircling said drum having confronting ends, an operating rod passed loosely through said ends and connected with one of them, a cam bar movable axially of said drum and engageable with said rod for contracting said band about said drum, means for supporting said band against the axial thrust of said cam bar comprising a fixed support located behind said brake drum, and a strut member having a pivotal connection with said support and a bearing on said rod and extended axially of said drum therebetween and having a notched end in which said rod is located.

5. Brake mechanism for reversing mechanism comprising a brake drum, a brake band encircling said drum having confronting ends, an operating rod passed loosely through said ends and connected with one of them, a cam bar movable axially of said drum and engageable with said rod for contracting said band about said drum, and means for supporting said band against the axial thrust of said cam bar comprising a fixed support located behind said brake drum, and a strut member disposed axially of said drum and receiving the axial thrust on said band and having a connection with said support and bearing on said rod beside said cam bar and between it and the adjacent band-end and constituting a wear plate on which said cam bar slides.

6. Brake mechanism for reversing mechanism comprising a brake drum, a brake band encircling said drum having confronting ends, an operating rod passed loosely through said ends and connected with one of them, a cam bar movable axially of said drum and exerting pressure on said rod and said other end of said band in opposite directions for contracting said band, and means for supporting said band against the axial thrust of said cam bar comprising a fixed support located in the rear of said drum, and a strut member connected with and extended axially of said drum and forwardly of said support to and connected with said rod and located between said other end of said band and said cam bar.

7. Brake mechanism for reversing mechanism comprising a brake drum, a brake band encircling said drum having confronting ends, an operating rod passed loosely through said ends and connected with one of them, a cam bar movable axially of said drum and exerting pressure on said rod and said other end of said band in opposite directions for contracting said band, operating mechanism for said bar comprising an arm connected with said bar and a cross shaft fixed to said arm, and means for supporting said band against the axial thrust of said bar comprising a rigid strut link pivoted on said cross shaft and engaged with and bearing on said rod.

8. Brake mechanism for reversing mechanism comprising a brake drum, a brake band encircling said drum having confronting ends, an operating rod passed loosely through said ends and connected with one of them, a cam bar movable axially of said drum and exerting pressure on said rod and said other end of said band in opposite directions for contracting said band, operating mechanism for said bar comprising an arm connected with said bar and a cross shaft fixed to said arm, and means for supporting said band against the axial thrust of said bar comprising a rigid strut link pivoted at one end of said cross shaft and having a notch in its other end in which said rod is removably located.

9. Brake mechanism for reversing mechanism comprising a brake drum, a brake band encircling said drum having confronting ends, an operating rod passed loosely through said ends and connected with one of them, a cam bar movable axially of said drum and exerting pressure on said rod and said other end of said band in opposite directions for contracting said band, operating mechanism for said bar comprising an arm connected with said bar and a cross shaft fixed to said arm, and means for supporting said band against the axial thrust of said bar comprising a rigid strut link pivoted on said cross shaft and bearing on said rod and interposed between said other end of said band and said cam bar.

10. Brake mechanism for reversing mechanism comprising a brake drum, a brake band encircling said drum having confronting ends, an operating rod passed loosely through said ends and connected with one of them and having a roller spaced from the other band end, a cam bar movable axially of said drum and located between said other band end and said roller and exerting pressure in opposite directions on both, and means for supporting said band against the axial thrust of said cam bar comprising a fixed support, and a rigid thrust link having one end pivoted on said support and the other end located between said other band end and said cam bar and surrounding said rod.

11. Brake mechanism for reversing mechanism comprising a brake drum, a brake band encircling said drum having confronting ends, an operating rod passed loosely through said ends and connected with one of them and having a roller spaced from the other band end, a cam bar movable axially of said drum and located between said other band end and said roller and exerting pressure in opposite directions on both, an operating arm connected with said cam bar, a cross shaft fixed to said arm, and means for supporting said band against the axial thrust of said cam bar comprising a rigid thrust link having one end pivotally supported on said cross shaft, and having its other end located between said other band end and said cam bar and having a notch in which said rod is located, said link constituting a bearing support on which said cam bar is seated.

12. Brake mechanism for reversing mechanism comprising a brake drum, a brake band encircling said drum having confronting ends, an operating rod passed loosely through said ends and connected with one of them and having a roller spaced from the other band end, a cam bar movable axially of said drum and located between said other band end and said roller and exerting pressure in opposite directions on both, an operating arm connected with said cam bar, a cross shaft fixed to said arm, means for supporting said band against the axial thrust of said cam bar comprising a rigid thrust link having one end pivotally supported on said cross shaft, and having its other end located between said other band end and said cam bar and having a notch in which said rod is located, said link constituting a bearing support on which said cam bar is seated, and means removably attaching said link to said other band end.

13. Brake mechanism for reversing mechanism comprising a brake drum, a brake band encircling said drum having confronting ends, an operating rod passed loosely through said ends and connected with one of them and having a roller spaced from the other band end, a cam bar movable axially of said drum and located between said other band end and said roller and exerting pressure in opposite directions on both, said cam bar exerting a thrust on said band that is directed axially thereof, and means for supporting said band against the axial thrust of said cam bar including a thrust-resisting member located behind and extended axially of and having a thrust resisting connection with said band and constituting a bearing support for said cam bar.

14. Brake mechanism for reversing mechanism comprising a brake drum, a brake band encircling said drum, means including a cam bar movable axially of said drum for contracting said band about said drum, said cam bar exerting a thrust on said band that is directed axially thereof, and means supporting said band against the axial thrust of said cam bar comprising a thrust member extended axially of and connected with said band and constituting a support for said cam bar and against which the band contracting pressure of said bar is exerted, and a supporting member located behind said brake drum and supporting an end of said thrust member and resisting the thrust thereof.

15. Brake mechanism for reversing mechanism comprising a brake drum, a brake band encircling said drum and having confronting ends, means for contracting said band about said drum including a rod passed loosely through said confronting band ends and connected with one of them and having a cam roller spaced from said other band end, a cam bar movable axially of said drum and located between said other band end and said roller for moving said rod and band end in opposite directions to contract said band, a cross shaft located at one end of said drum, a hub fixed to said shaft having an arm pivotally connected with said cam bar, and means to support said band against the axial thrust of said cam bar comprising a link having an end loosely mounted on an extended end of said cross shaft adjacent said hub, said hub having an opposed extension which overlies said link and restrains it from displacement from said shaft, and the other end of said link is located between said other band end and said cam bar and having a notch in which said rod is located.

16. Brake mechanism for reversing mechanism comprising a brake drum, a brake band encircling said drum and having confronting ends, a draw-rod passed through said ends for drawing them toward each other for contracting said band, said rod having a cam roller at one end which confronts one band end, a cam bar located between said one band-end and said roller and engageable therewith for moving said rod lengthwise, a strut member for holding said band against movement axially of said drum having a fixed end and an end which is engaged with said rod and lies between said one band end and said cam bar, and means including a spring for holding said one band end, said strut member and said cam bar in engagement.

17. Brake mechanism for reversing mechanism comprising a brake drum, a brake band encircling said drum having confronting ends, a brake-contacting rod extended loosely between said band-ends having one end connected to one band-end for moving it toward the other band-end, said rod being extended beyond the other band-end and having a cam-roller, a cam-bar located between said other band-end and roller for moving said rod lengthwise, a cross-shaft having means for reciprocating said cam-bar, a strut member pivoted at one end on said shaft and having its other end connected with said rod between said other band-end and said cam-bar, and a spring encircling said rod between said band-ends for expanding said band and also for holding said other band-end, strut-member and cam-bar in engagement.

CHARLES JAMES ROBERTSON.